United States Patent Office 2,720,420
Patented Oct. 11, 1955

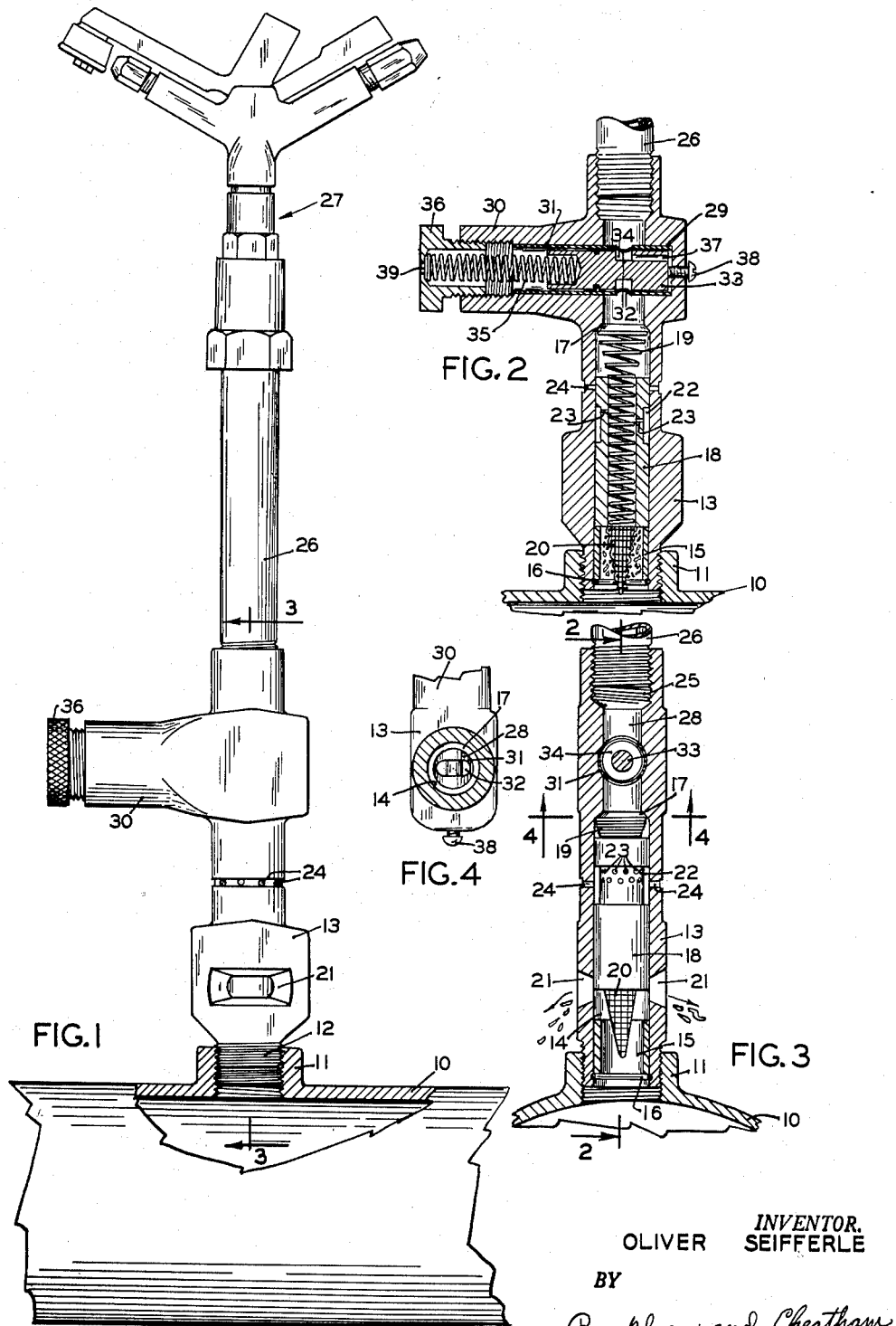

2,720,420
SELF-FLUSHING AND PRESSURE REGULATING FITTING FOR IRRIGATION SPRINKLER

Oliver Seifferle, Baker, Oreg.

Application March 15, 1954, Serial No. 416,230

4 Claims. (Cl. 299—59)

The present invention relates to a self-flushing riser for sprinkler heads. The principal purpose of the present invention is to prevent debris, which is usually present in field irrigation sprinkler systems, from clogging the sprinkler heads, and automatically to eject such debris from the system. Modern field irrigation systems comprise large main conduits which may be permanently placed, but which are usually composed of sections of pipe coupled together by separable couplings whereby the conduit may be rapidly moved from place to place about a large field to be irrigated. When the disassembled pipes are being moved, it is practically impossible to prevent leaves and other debris from being deposited in the pipes. A further source of such debris is the water supply source since the farmer usually draws water from an open irrigation ditch, a stream, or a series of wells, and it is practically impossible to prevent leaves and other debris from entering the system from such sources. A further cause of debris being deposited in the pipe is the custom of storing disassembled pipes in piles when not in use, and the habit of rodents and birds of building nests therein during the periods of disuse. It is, of course, possible to inspect the pipe sections and to dislodge large leaves, twigs and rubbish, but such large items are not the principal cause of trouble. To be sure, they might plug the inlet to a sprinkler head riser, but usually the large particles are flushed to the end of the pipeline. The principal causes of trouble in a field irrigation system are the small particles of leaves which are forced upwardly through the sprinkler head riser and clog the jet or orifices of the sprinkler head. The present invention is designed to eliminate difficulties occasioned by such small particles.

A further object of the present invention is to provide a self-flushing riser having a flushing opening in the wall thereof adapted to be uncovered by a valve, in which the opening is largely or fully uncovered at each flushing operation, such object being accomplished by the provision of pressure relief means incorporated in the valve mechanism.

A further object of the present invention is to provide such a self-flushing riser in combination with a pressure regulating device so constructed and arranged that the accumulation of debris in the riser prior to ejectment thereof by an automatic self-flushing action does not diminish the flow through the sprinkler head, the pressure regulating valve being designed to open proportionately as the pressure drops due to the accumulation of debris.

The foregoing and other objects and advantages of the present invention will be more readily apparent from inspection of the accompanying drawings taken in connection with the following specification, wherein like numerals refer to like parts throughout and wherein preferred embodiments of the present invention are illustrated and described.

In the drawings,

Fig. 1 is a view in side elevation, partially broken away, showing a section of a supply conduit having the present invention mounted thereon and supporting a sprinkler head;

Fig. 2 is a vertical section taken substantially along line 2—2 of Fig. 3 through the present invention;

Fig. 3 is a vertical section taken substantially along line 3—3 of Fig. 1 through the present invention; and Fig. 4 is a horizontal section taken along line 4—4 of Fig. 3.

In Fig. 1 a main water supply conduit 10 is illustrated as having an internally threaded outlet nipple 11, into which is inserted the threaded lower end 12 of the riser. The riser comprises a hollow body 13 having a cylindrical bore 14 extending vertically therethrough in the direction of elongation of the hollow body. A lower abutment in the lower end of the cylindrical bore is defined by the upper end of a bushing 15 maintained in position by a snap ring 16 seated in an internal groove in the body. An upper abutment in the upper end of the cylindrical bore is defined by an internal shoulder 17 in the hollow body. A sleeve valve 18 having an open passage therethrough is slidably mounted in the cylindrical bore 14, the lower end of the sleeve normally resting upon the upper edge of the abutment defining bushing 15, and the upper end of the sleeve valve being spaced a distance below the upper abutment defined by the shoulder 17. A spiral spring 19 having a cylindrical lower portion and an upwardly enlarging tapered portion is seated within the body, the cylindrical lower portion fitting within the passage through the sleeve valve and the upper end thereof bearing against the shoulder 17 whereby the spring presses downwardly upon the sleeve valve and normally holds the valve seated against the lower abutment. The strength of the spring is such that the sleeve valve is held in its lower position as long as a conical sieve 20 on the lower end of the valve remains unobstructed or is only slightly obstructed. The sieve 20 is in the form of a right cone with steeply sloping sides, the upper open end thereof being secured to the lower end of the sleeve valve in concentric relation thereto, and the apex of the sieve being directed downwardly and centrally of the passage through the riser body. The length of the sieve is preferably such that it does not project into the stream of water flowing longitudinally of the main conduit 10. The spring 19 is designed to yield against the increased pressure exerted against the lower end of the sleeve valve as debris builds up on the sieve 20, the upward movement of the valve being at first gradual as the upward force thereagainst increases as bits of debris accumulate. A pair of flushing openings 21 extend through the wall of the body 13 on opposite sides thereof, the flushing openings being relatively large, of considerable height and substantially as wide as the passageway through the sleeve valve. The upward travel of the sleeve valve is permitted to the extent that the flushing openings 21 are entirely, or at least largely, uncovered when the sleeve valve is at its upper limit of movement.

In order that the uncovered areas of the flushing opening shall be large enough to permit rapid gushes of a large volume of water to dislodge bits of debris from the sieve and eject them through the flushing openings, means are provided in the sleeve valve and the riser body whereby the upper portion of the movement of the sleeve valve is rapidly accomplished. If the slow movement of the valve were continued until the lower edge of the valve cleared the lower edges of the flushing openings, a fine spray of water would escape which might not dislodge the debris and which might cause the valve to become locked in this position with attendant diminished flow through the sprinkler head. The means for permitting rapid movement of the sleeve valve to uncover the flushing openings to a large extent comprise back pressure relief means, as follows. The sleeve valve 18 is provided with an external, annular recess 22 extending around the valve near its top, and the wall of the valve within the recess is provided with a plurality of perforations 23. Water is normally prevented from flowing through the perforations 23 since the sleeve is in snug fitting engagement with the wall of the bore. However, the wall of the riser 13 is provided with a plurality of pressure relief openings 24 which are of lesser diameter than the width of the recess 22. The back pressure openings 24 communicate with the upper edge of the recess 22 just before the lower edge of the valve clears the lower edges of the flushing openings 21. This sudden release of back pressure on the upper end of the sleeve valve permits it to jump upwardly to the extent required to open the flushing openings so that debris will be flushed out. As soon as the upward pressure against the sieve is reduced by the removal of the debris, the spring 19 returns the valve to its seated condition, thereby closing the flushing openings and closing the back pressure relief openings.

The riser is provided with an internally threaded socket 25 in its upper end, into which is fitted the lower, threaded end of an extension pipe 26 which supports a sprinkler head 27 of any desired type on its upper end. The upper portion 28 of the passage through the riser body is intersected by a horizontal socket 29 in a lateral extension 30 of the riser body. A liner sleeve 31 is slipped into the socket, the liner sleeve having a pair of upper and lower transverse slots 32 therein which are in line with the passage 28. A pressure regulating valve 33 is slidably positioned in the liner sleeve 31 and is provided with an annular recess 34 which normally communicates with the slots 32. The outer end of the valve 33 is provided with a socket into which extends one end of a spring 35, the outer end of which is received in a socket in a knurled plug 36 threadedly engaged in the outer end of the extension 30. A pressure balancing opening 37 extends from the recess 34 to the inner end of the valve whereby the pressure existing within the riser body is exerted in the space between the inner end of the valve and the inner end of the socket in which the valve is mounted. An adjustment screw 38 extends through the wall of the body to limit the extent of inward movement of the valve as caused by the spring 35. The force exerted against the inner end of the valve by the water is balanced against the adjusted force of the spring 35 plus atmospheric pressure which is permitted to work against the outer end of the valve through a vent opening 39 in the plug 36. The plug 36 is screwed in or out so as to adjust normal flow through the riser extension pipe 26. The compression of the spring 35 is so adjusted that the annular recess 34 does not register with the slots 32 to its fullest extent when the sieve 20 is unobstructed by debris. However, as the sieve 20 gradually becomes obstructed by accumulating debris, the pressure exerted through the pressure balancing passage 37 decreases and the spring, plus atmospheric pressure, moves the valve inwardly to increase the extent of uncoverage of the slots 32. By reason of this construction the flow through the sprinkler head 27 is maintained constant, the amount of water passing through the jet orifice of the sprinkler head increasing in proportion to the lessening of pressure occasioned by accumulations of debris on the sieve 20. It is to be appreciated that the pressure regulating valve operates in cooperation with the flushing valve whereby flow through the sprinkler head remains constant, if such should be desired. However, the pressure regulating valve may be omitted and the self-flushing valve portion be connected directly to the riser extension pipe 26 without affecting the operation of the self-flushing valve in any respect, and conversely the pressure regulating valve portion can be connected directly to the outlet connection 11 without the intervening self-flushing valve portion. The latter construction may be desirable where the main line is kept free of foreign material so that there is no necessity for flushing. However, there might still be pressure fluctuations calling for the use of a pressure regulating valve in order to maintain constant flow through the sprinkler head.

Having illustrated and described a preferred embodiment of the present invention, it should be apparent to those skilled in the art that the same permits of modification in arrangement and detail. I claim as my invention all such modifications as come within the true spirit and scope of the appended claims.

I claim:

1. A self-flushing riser for a sprinkler head comprising an elongated hollow body adapted to be connected in upright position between a water supply conduit and a sprinkler head, said body having a cylindrical bore therein, a cylindrical sleeve valve slidably mounted in said cylindrical bore, said valve having a passage therethrough whereby water may flow from the conduit to the sprinkler head, means providing a lower abutment within said bore upon which said valve normally rests, means providing an upper abutment within said bore in spaced relation to the upper end of said valve, a conical sieve mounted upon and fixed to the lower end of said valve and having its apex directed downwardly, and a spring seated against said upper abutment and bearing downwardly against said valve whereby said valve is normally held against said lower abutment, said body having a flushing opening extending laterally from said cylindrical bore above said lower abutment, said flushing opening being normally closed by said valve but being within the range of movement of the lower end of said valve when said spring is fully compressed, said spring holding said valve seated against said lower abutment against the force of the water traversing said body when said sieve is unobstructed, but being yieldable against the pressure exerted by the water against debris partially obstructing said sieve whereby said valve is automatically opened and debris flushed through said flushing opening.

2. The construction set forth in claim 1; in combination with a pressure regulating valve placed between said sleeve valve and the sprinkler head, said pressure regulating valve being of the type to increase the passageway therethrough proportionately as the water pressure decreases whereby the water flow through said sprinkler head remains constant as debris builds up on said sieve.

3. A self-flushing riser for a sprinkler head comprising an elongated hollow body adapted to be connected in upright position between a water supply conduit and a sprinkler head, said body having a cylindrical bore therein, a cylindrical sleeve valve slidably mounted in said cylindrical bore, said valve having a passage therethrough whereby water may flow from the conduit to the sprinkler head, means providing a lower abutment within said bore upon which said valve normally rests, means providing an upper abutment within said bore in spaced relation to the upper end of said valve, a conical sieve mounted upon and fixed to the lower end of said valve and having its apex directed downwardly, and a spring seated against said upper abutment and bearing downwardly against said valve whereby said valve is normally held against said lower abutment, said body having a flushing opening extending laterally from said cylindrical bore above said lower abutment, said flushing opening being normally closed by said valve but being within the range of movement of the lower end of said valve when said spring is fully compressed, said spring holding said valve seated against said lower abutment against the force of the water traversing said body when said sieve is unobstructed, but being yieldable against the pressure exerted by the water against debris partially obstructing said sieve whereby said valve is automatically opened and debris flushed through said flushing opening, said valve having an external, annular recess therein adjacent its upper end and the wall of said valve within said recess being perforated, and said body having a pressure relief opening therein normally closed by the upper portion of said valve, the arrangement of said valve with respect to said flushing opening and said pressure relief opening being such that said recess registers with said pressure relief opening after said valve has risen from its seat and moved a portion of its permissible upward travel, and remains in registry therewith during the remainder of the upward travel of the valve whereby upward movement of the valve is at first gradual as debris accumulates on said sieve and then rapid as back pressure above said valve is relieved through said pressure relief opening whereby said flushing opening may be largely uncovered and the ejection of debris accomplished.

4. A self-flushing riser for a sprinkler head comprising an elongated hollow body adapted to be connected in upright position between a water supply conduit and a sprinkler head, said body having a cylindrical bore therein, a cylindrical sleeve valve slidably mounted in said cylindrical bore, said valve having a passage therethrough whereby water may flow from the conduit to the sprinkler head, means providing a lower abutment within said bore upon which said valve normally rests, means providing an upper abutment within said bore in spaced relation to the upper end of said valve, a conical sieve mounted upon and fixed to the lower end of said valve and having its apex directed downwardly, a spring seated against said upper abutment and bearing downwardly against said valve whereby said valve is normally held against said lower abutment, said body having a flushing opening extending laterally from said cylindrical bore above said lower abutment, said flushing opening being normally closed by said valve but being within the range of movement of the lower end of said valve when said spring is fully compressed, said spring holding said valve seated against said lower abutment against the force of the water traversing said body when said sieve is unobstructed, but being yieldable against the pressure exerted by the water against debris partially obstructing said sieve whereby said valve is automatically opened and debris flushed through said flushing opening, and means to relieve back pressure exerted downwardly on said sleeve valve when said sleeve valve has travelled a part of its upward movement whereby said flushing opening is largely uncovered.

References Cited in the file of this patent
UNITED STATES PATENTS

| | | |
|---|---|---|
| 297,373 | Freeze | Apr. 22, 1884 |
| 312,484 | Luther | Feb. 17, 1885 |
| 2,594,045 | Loepsinger | Apr. 22, 1952 |